United States Patent [19]
Martins

[11] Patent Number: 5,146,766
[45] Date of Patent: Sep. 15, 1992

[54] ANCHOR PLATE FOR FASTENING INLET AND OUTLET BRANCHES OF AN EVAPORATOR

[76] Inventor: Carlos Martins, 9, rue Dampierre, 78720 Senlisse, France

[21] Appl. No.: 777,666

[22] Filed: Oct. 15, 1991

[30] Foreign Application Priority Data

Oct. 17, 1990 [FR] France ................... 90 12834

[51] Int. Cl.$^5$ ............................................. F16L 39/00
[52] U.S. Cl. ..................................... 62/298; 285/137.1
[58] Field of Search ........................ 62/515, 298, 299; 285/137.1, 131, 137.2

[56] References Cited

U.S. PATENT DOCUMENTS

| | | | |
|---|---|---|---|
| 3,869,152 | 3/1975 | De Vincent | 285/137.1 |
| 3,869,153 | 3/1975 | De Vincent et al. | |
| 3,958,418 | 9/1974 | Heidacker et al. | |
| 4,468,054 | 8/1984 | Orth | 285/137.1 |

FOREIGN PATENT DOCUMENTS 1255417 11/1967 Fed. Rep. of Germany .

Primary Examiner—Alan Cohan

[57] ABSTRACT

An air conditioning installation for a motor vehicle is of the kind comprising an evaporator having an inlet branch and an outlet branch, arranged substantially horizontally and one above the other, with each branch having a radial bead. An expansion chamber is removably but sealingly attached to the branches by an anchor plate which is fastened by a screw so as to bear on the beads so that the latter compress seals against receiving surfaces of the expansion chamber. The anchor plate is in the form of an elongated plate having two through slots which are open at opposite ends of the plate and in which the two branches are supported. Each slot has a semi-circular base portion fitting the circumference of the corresponding branch of the evaporator, and each of these base portions is extended substantially tangentially to define parallel edges of the slot.

The parallel edges of the slots in the anchor plate are inclined with respect to the plane that contains the geometrical centers of the semi-circular base portions.

6 Claims, 1 Drawing Sheet

ANCHOR PLATE FOR FASTENING INLET AND OUTLET BRANCHES OF AN EVAPORATOR

FIELD OF THE INVENTION

This invention relates to an anchor plate for the simultaneous fastening of an inlet branch and an outlet branch of a heat exchanger of the evaporator type to an expansion chamber in an air conditioning installation, in particular for a motor vehicle. The invention further relates to an air conditioning installation incorporating such an anchor plate.

BACKGROUND OF THE INVENTION

In air conditioning installations for motor vehicles, it is known to provide an evaporator having an inlet branch and an outlet branch which are fastened to an expansion chamber and which, at least in the zone in which they meet the latter, are arranged substantially horizontally with one above the other (typically in a common vertical plane). In these known arrangements, the anchor plate bears on beads formed on the two branches, in order to compress sealing elements between the beads and suitable reception surfaces of the expansion chamber under the action of gripping or fastening means such as screws, which urge the anchor plate towards the expansion chamber. Such an anchor plate is in the form of an elongated plate having two slots formed through its thickness. These slots are open at the respective opposite ends of the plate. Each slot receives a respective one of the two branches, and each slot is in the form of an aperture having parallel edges, the width of which is slightly greater than the diameter of the corresponding branch of the evaporator, the slot being terminated in a semi-circular base portion the diameter of which corresponds to the width of the aperture. These slots are arranged back to back, with their median lines extending in the plane that contains the axes or geometrical centres of the semi-circular base portions.

In such installations, the expansion chamber is a relatively fragile component, which requires to be replaced quite often. When the anchor plate is disconnected from the expansion chamber and released, by unscrewing the screws, it tends to tilt on the lower branch in the plane which contains the axes of the two branches, so that it can then lie entirely within the space lying between the two branches, from which it can too easily slip sideways and fall out of reach. It is then hard to retrieve it from the bottom of the engine compartment of the vehicle. The danger of this happening is increased as the plane of the axes of the branches becomes more nearly vertical, since frictional effects between the branches and the edges of the slots become correspondingly reduced.

DISCUSSION OF THE INVENTION

An object of the present invention is to overcome the above disadvantage and to provide an anchor plate which is hard to lose, being arranged to be retained in position on the inlet and outlet branches of the evaporator when the latter is disconnected from the expansion chamber.

According to the invention, an anchor plate for the simultaneous fastening of an inlet branch and an outlet branch of an evaporator to an expansion chamber in an air conditioning installation, in particular for a motor vehicle, where the said branches are disposed substantially horizontally and substantially one above the other and the said anchor plate is arranged to bear on beads of the said branches in order to compress sealing elements between the said beads and receiving surfaces of the expansion chamber under the action of gripping means urging the anchor plate towards the expansion chamber, the anchor plate being in the form of an elongated plate through the thickness of which there extend two slots which are open respectively in the two opposed ends of the anchor plate and which are adapted to receive the respective said branches, wherein the slots include semi-circular base portions which are adapted to the circumference of the said branches, with at least a first said slot defining, between the end of the anchor plate and the semi-circular base portion of that slot, an aperture having parallel edges which are substantially tangential to the latter, is characterised in that the said edges are inclined with respect to the plane which contains the axes of the semi-circular base portion.

Preferably, the two said slots define apertures having parallel edges which are inclined with respect to the said plane, with the median lines of the slots diverging from the said plane on the two opposed sides respectively of the latter.

Preferably, the angle of inclination of the edges of the slots lies in the range 5 to 45 degrees.

Retention of the anchor plate in position is improved even more when the depth of at least the first slot is substantially greater than the diameter of the corresponding inlet or outlet branch.

The invention also includes an air conditioning installation, in particular for a motor vehicle, comprising an evaporator having an inlet branch and an outlet branch which are arranged substantially horizontally and substantially one above the other, and which are fastened to an expansion chamber by means of an anchor plate which bears against beads of the said branches in order to compress sealing elements between the latter and receiving surfaces of the expansion chamber under the action of gripping means which urge the anchor plate towards the expansion chamber, wherein the anchor plate is in the form of an elongated plate, through the thickness of which there extend two slots which are open respectively in opposite ends of the plate, with each said slot receiving a respective one of the two said branches, the said slots having semi-circular base portions adapted to the circumference of the said branches, with at least a first of the said slots defining, between the end of the anchor plate and the semi-circular base portion of that slot, an aperture having parallel edges which are substantially tangential to the latter, in which the anchor plate is an anchor plate according to the invention as defined above.

Further features and advantages of the invention will appear more clearly from the detailed description, given below, of a preferred embodiment of the invention, which is however given by way of example only and which is made with reference to the accompanying drawings.

DESCRIPTION OF A PREFERRED EMBODIMENT OF THE INVENTION

Figure 1:
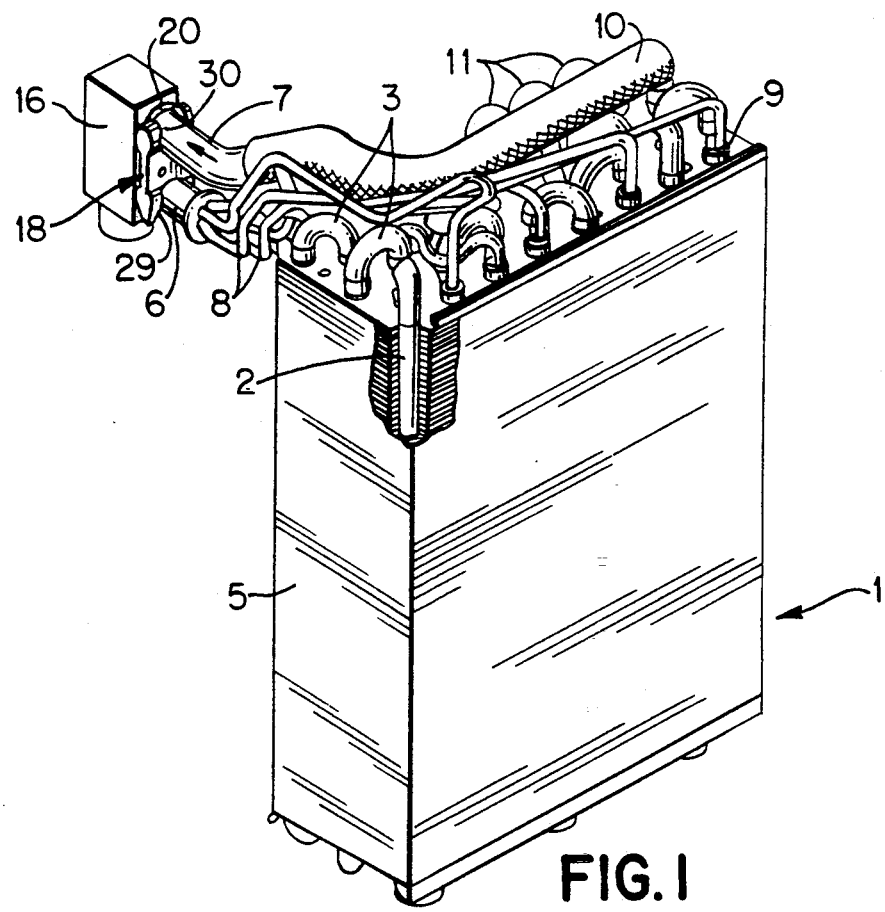
FIG. 1 is a perspective view of part of an air conditioning installation in accordance with the invention, showing the evaporator with its inlet and outlet branches, the expansion chamber, and an anchor plate according to the invention.

The evaporator 1 shown in FIG. 1 is part of an air conditioning installation for a motor vehicle. The evaporator includes a multiplicity of heat exchange tubes, each of which consists of a plurality of straight tubular sections 2 extending vertically. The tubular sections 2 are joined together in series by means of upper U-shaped tubular sections 3 and lower U-shaped tubular sections 4. Each upper U-shaped section 3 joins the upper ends of two of the straight tube sections, and each lower U-shaped section 4 similarly joins the lower ends of two straight sections 2. The straight tube sections 2 extend through a multiplicity of fins 5 in the form of plates, which are arranged horizontally one above another.

An input branch 6 and an output branch 7 are arranged for passing a refrigerant fluid into and out of the evaporator 1. The input branch 6 divides into a number of elementary tubes 8, each of which is connected to the input end 9 of a respective one of the heat exchange tubes comprising the sections 2, 3 and 4. The output branch 7 forms an extension of a collector 10, which is connected through elementary tubes 11 to the output ends of the heat exchange tubes 2, 3, 4. The input and output ends of the heat exchange tubes, the elemental tubes 11, and the collector 10 are all arranged above the stack of fins 5.

Figure 3:
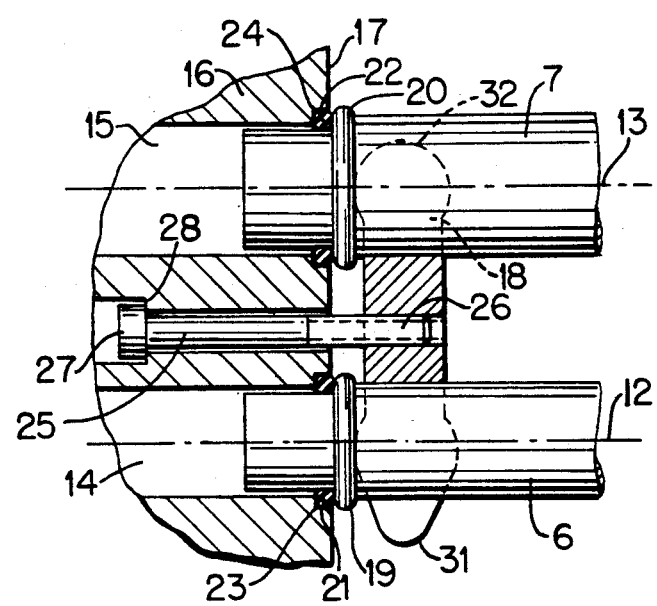
FIG. 3 is a view of the anchor plate seen in cross section taken on the line III—III in FIG. 2, and also showing the end portions of the inlet and outlet branches together with part of the expansion chamber.

The axes 12 and 13 of the input branch 6 and output branch 7 respectively are arranged, as can be seen in FIG. 3, substantially horizontally and in a common vertical plane, with the branch 7 lying above the branch 6. The free terminal ends of the branches 6 and 7 are engaged in respective orifices 14 and 15 of an expansion chamber 16, so as to penetrate through a vertical face 17 of the latter. In order to connect the input and output branches sealingly to the orifices 14 and 15, an anchor plate 18 is provided. The anchor plate 18 bears on annular beads 19 and 20 which are formed on the respective branches 6 and 7, so as to compress respective 0-ring seals 21 and 22 into annular seatings 23 and 24 respectively which define terminal radial enlargements of the orifices 14 and 15 adjacent to the face 17. The anchor plate 18 is held against the beads 19 and 20 by means of screws 25 which are fitted in threaded holes 26 extending through the thickness of the anchor plate 18. The head 27 of each screw 25 bears on a respective surface 28 formed in the expansion chamber and facing away from the anchor plate 18.

Figure 2:
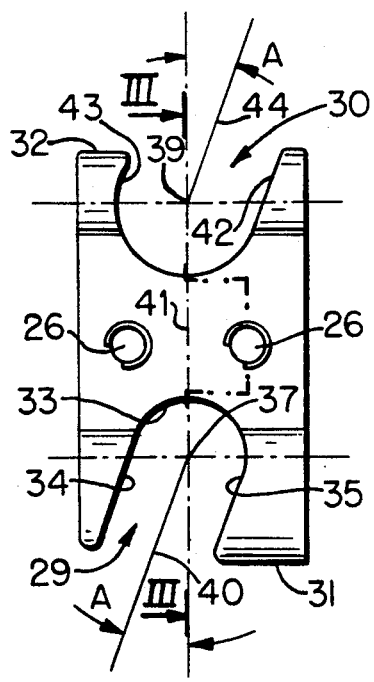
FIG. 2 is a front view of the anchor plate.

The plate 18 is in the form of an elongated plate, having two slots 29 and 30 extending through its thickness and being also open at the opposed ends 31 and 32 respectively of the plate 18. The inlet branch 6 fits in the slot 29, while the outlet branch 7 fits in the slot 30. Each slot 29, 30, considered in the general plane of the anchor plate 18 as seen in FIG. 2, includes a semi-circular base portion, 33 and 38 respectively, having respective axes 37 and 39. These base portions are adapted to fit the circumference of the corresponding branch 6 or 7 so as to surround half of that circumference, with just sufficient clearance to enable the branch to be introduced into the appropriate slot.

Between its base portion 33 and the end 31 of the anchor plate, the slot 29 defines an aperture with parallel straight edges 34 and 35, which are substantially tangential to the circular base portion 33. The parallel edges 34 and 35, and consequently the median line 40 of the slot 29, which is equidistant from them, are inclined with respect to the plane 41 that contains the axes 37 and 39 of the semi-circular base portions 33 and 38. The angle A of this inclination is 20 degrees.

The slot 30 has a straight edge 42 between one end of its semi-circular base portion 38 and the end 32 of the anchor plate 18. Opposite the edge 42, the semi-circular base portion 38 terminates very close to the end 32 of the anchor plate, and is joined to the latter through a very short straight edge 43 which is substantially parallel to the straight edge 42. The edges 42 and 43, and the median line 44 of the slot 30, are inclined with respect to the plane 41 by the same angle A. The median line 40 lying between the edges 34 and 35 of the slot 29 is spaced away from the plane 41 towards the left as seen in FIG. 2, extending downwardly from the axis 37. The median line 44 lying between the edges 42 and 43 of the slot 30 diverges to the right (again as seen in FIG. 2) of the plane 41, so as to extend upwardly from the axis 39. The various edges 34, 35, 42 and 43 and the median lines 40 and 44 are thus all parallel to each other. In addition, the depth of the slot 29 from the end 31 of the anchor plate is substantially greater (by about 50%) than the diameter of the inlet branch 6.

In order to remove the expansion chamber 16, the screws 25 must first be removed so as to release the anchor plate 18. The latter has a tendency to tilt due to its own weight, in the plane of the axes 12 and 13 of the branches 6 and 7, which coincides with the plane 41. However, the inclination of the slots 29 and 30 prevents such tilting movement taking place, by virtue of the straight edge 43, and more especially the straight edge 35, being in engagement on the respective branches 7 and 6. The anchor plate 18 thus remains in position ready to be fastened to a new expansion chamber. However, this arrangement does not in any way hinder the fitting of the anchor plate during initial assembly, or any removal of the anchor plate that may need to be done, because these operations can be carried out simply by moving the two branches 6 and 7 slightly apart by virtue of their inherent elasticity.

In the embodiment described above and shown in the drawings, the parallel edges of the two slots are inclined with respect to the plane of the axis of the semi-circular base portions of the slots, in such a way that the median lines of the slots diverge from this plane on the two respective opposed sides of the latter. In a modification, however, the parallel edges are so inclined that the median lines of the slots diverge from the above mentioned plane on the same side of the latter. In that case, the edges of the respective slots are inclined with respect to each other by an angle equal to the sum of the angles of inclination of the edges of each slot with respect to the plane of the axes.

Other modifications may be made as variants on the embodiment described and shown, without departing from the ambit of the invention. For example, inclined edges may be provided on only one of the slots in the anchor plate. It is not always necessary to arrange that the depth of one slot shall be substantially greater than the diameter of the corresponding inlet or outlet branch. On the other hand, it is also possible to provide this feature on both of the two slots.

What is claimed is:

1. An anchor plate for simultaneously fastening an inlet branch and an outlet branch of an evaporator of an air conditioning installation to an expansion chamber of the same installation, where the two said branches are substantially horizontal and arranged one above the other, with each said branch having a bead for engagement by the anchor plate thereon in order to compress a sealing element between the bead and a receiving surface of the expansion chamber, the anchor plate comprising an elongated plate having means for engaging gripping means adapted to secure the anchor plate to the expansion chamber whereby to cause the former to be urged towards the expansion chamber, the said plate having two slots extending through its thickness and being open at respective opposite ends of the plate, with each said slot being configured so as to receive a respective one of the said branches, wherein each said slot has a semi-circular base portion adapted to the circumference of the corresponding said branch, with at least a first said slot defining an aperture extending between the corresponding end of the plate and the semi-circular base portion of the same slot, the said aperture having parallel edges which are substantially tangential to the base portion, with the said edges being inclined with respect to a plane containing the geometrical centre of the two semi-circular base portions.

2. An anchor plate according to claim 1, wherein both said slots define apertures having parallel edges inclined with respect to the said plane, with the two slots defining median lines diverging from the said plane on opposite sides of the latter.

3. An anchor plate according to claim 1, wherein the two said slots define apertures having parallel edges inclined with respect to the said plane, and further define median lines of the slots which diverge from the said plane on the same side of the latter.

4. An anchor plate according to claim 1, wherein the angle of inclination of the said parallel edges with respect to the said plane is in the range 5 to 45 degrees.

5. An anchor plate according to claim 1, wherein the depth of at least the said first slot is substantially greater than twice the radius of its base portion.

6. An air conditioning installation for a motor vehicle, comprising: an evaporator having an inlet branch and an outlet branch, the said branches being disposed substantially horizontally and one above the other, with each said branch defining a radial bead and a terminal portion extending beyond the bead; an expansion chamber having apertures in which the said terminal portions of the said branches are engaged, with each said aperture of the expansion chamber defining a receiving surface; sealing means mounted between each said bead and a corresponding said receiving surface; an anchor plate according to claim 1 arranged between the said branches on the opposite side of the said beads from the expansion chamber and with each branch nested in the semi-circular base portion of the corresponding slot of the anchor plate: and gripping means engaging the anchor plate so as to force the latter into engagement with the beads whereby to compress the said sealing elements.

* * * * *